R. LOWELL.
WATER-HOOKS FOR HARNESS.
No. 191,353. Patented May 29, 1877.
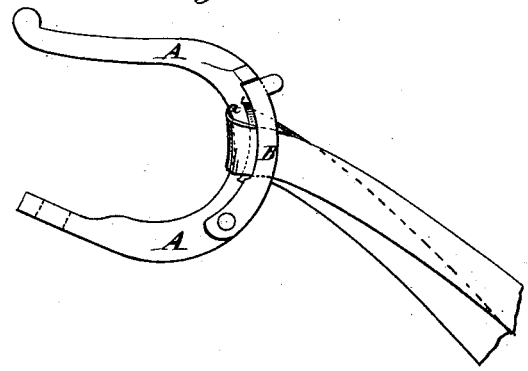
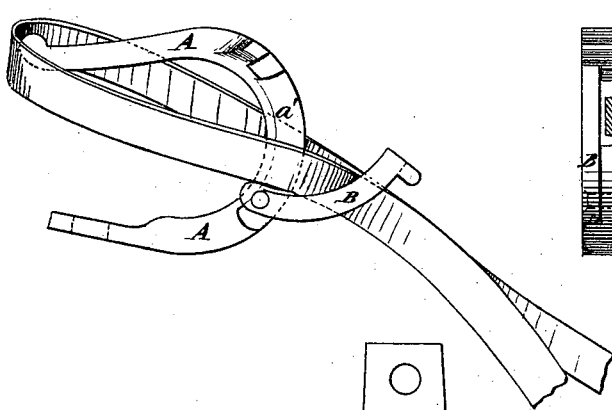
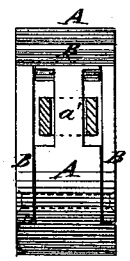
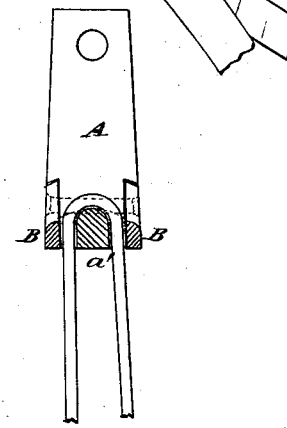
WITNESSES:
INVENTOR:
R. Lowell
BY
ATTORNEYS.

UNITED STATES PATENT OFFICE.

RICHARD LOWELL, OF FLUSHING, NEW YORK.

IMPROVEMENT IN WATER-HOOKS FOR HARNESS.

Specification forming part of Letters Patent No. 191,353, dated May 29, 1877; application filed April 16, 1877.

*To all whom it may concern:*

Be it known that I, RICHARD LOWELL, of Flushing, in the county of Queens and State of New York, have invented a new and useful Improvement in Water-Hooks, of which the following is a specification:

Figure 1 is a side view of my improved water-hook, showing the check in place. Fig. 2 is a side view of the same, showing the check being passed over the hook. Fig. 3 is a front view of the same, the check being shown in section. Fig. 4 is a horizontal section of the same.

Similar letters of reference indicate corresponding parts.

The object of this invention is to furnish an improved water-hook, which shall be so constructed as to prevent the check from coming off the hook accidentally, and which will not prevent the check from being put on and taken off with facility.

The invention consists in the combination of the U-shaped keeper with the neck formed upon the water-hook at its bend, as hereinafter fully described.

A represents the body of the water-hook, which may be of any of the ordinary shapes, and which is bolted to the saddle-tree in the usual way. Upon the forward part or bend of the hook A is formed a neck, $a'$, around which the check passes.

B is a U-shaped keeper, which is bent to correspond with the bend of the hook A, and the arms of which fit into recesses formed in the sides of the hook A. The arms of the keeper B are pivoted to the opposite sides of the hook A at the lower part of its bend, so that it may be swung forward, as shown in Fig. 2.

In checking the horse, the keeper B is swung forward into the position shown in Fig. 2, the loop of the check is put through it, and passed over the point of the hook, and the movement of the horse's head will draw it into place.

In unchecking the horse the loop of the check is drawn back and passed up over the point of the hook, and the movement of the horse's head will draw it out through the keeper B.

Having thus described my invention, I claim as new and desire to secure by Letters Patent—

The combination of the pivoted keeper B with the hook having the neck or reduced portion $a'$, substantially as and for the purpose specified.

RICHARD LOWELL.

Witnesses:
 JAMES T. GRAHAM,
 C. SEDGWICK.